(12) United States Patent
Gotowik et al.

(10) Patent No.: US 8,028,565 B2
(45) Date of Patent: Oct. 4, 2011

(54) TOOL FOR HYDRO-TESTING A NOZZLE

(75) Inventors: Horst Gotowik, Edmonton (CA); Daniel Bamford, Edmonton (CA); David Bamford, Edmonton (CA)

(73) Assignee: Ceda Specialty Mechanical Services, LP (CA)

( * ) Notice: Subject to any disclaimer, the term of this patent is extended or adjusted under 35 U.S.C. 154(b) by 0 days.

(21) Appl. No.: 12/508,358

(22) Filed: Jul. 23, 2009

(65) Prior Publication Data

US 2010/0043537 A1 Feb. 25, 2010

(30) Foreign Application Priority Data

Aug. 11, 2008 (CA) ...................................... 2638569

(51) Int. Cl.
*G01M 3/04* (2006.01)
*G01M 3/08* (2006.01)

(52) U.S. Cl. ............................................. 73/49.8; 73/46

(58) Field of Classification Search ................... 73/49.8, 73/49.3, 46
See application file for complete search history.

(56) References Cited

U.S. PATENT DOCUMENTS

| 6,463,791 B1 * | 10/2002 | Berube et al. ................. 73/49.8 |
| 6,675,634 B2 | 1/2004 | Berneski et al. |
| 2003/0029227 A1 * | 2/2003 | Gotowik ........................ 73/49.8 |
| 2009/0084165 A1 * | 4/2009 | Carson .......................... 73/49.8 |

* cited by examiner

*Primary Examiner* — Hezron Williams
*Assistant Examiner* — Nathaniel Kolb
(74) *Attorney, Agent, or Firm* — Erickson, Kernell, Derusseau & Kleypas, LLC

(57) ABSTRACT

There is described a novel tool and method for the isolation and pressure-testing of connections, such as welds, between a vessel and a nozzle or branch pipe. The nozzle testing tool comprises an improved seal that expands into sealing contact as testing pressure is increased. The tool can also be easily adjusted in order to accommodate variations in nozzle configuration.

14 Claims, 1 Drawing Sheet

TOOL FOR HYDRO-TESTING A NOZZLE

CROSS REFERENCE TO RELATED APPLICATION

This application claims the benefit of the filing date of Canadian patent application No. 2,638,569, filed Aug. 11, 2008.

FIELD OF THE INVENTION

This invention relates to a tool for testing or isolating connections between a tank, vessel, or pipe and a nozzle or branch pipe extending therefrom.

BACKGROUND

In industrial applications such as oil or gas refineries, offshore drilling and production platforms, pulp and paper plants, power utilities, oil and gas wells, marine facilities, or any other industry or plant involving vessels, the integrity of vessel nozzle welds or fittings often needs to be tested. In the oil and gas industry, for example, tight environmental and operating regulations exist on emissions from a weld or joint. Furthermore, as there are thousands of welds in each plant, it is in the industry's best interests to minimize the amount of fluid lost from each weld. Testing tools are therefore required to test the integrity and permeability of nozzle welds. Nozzle fittings must also be tested after welding to test and confirm structural strength.

Conventionally, pressure testing of a vessel nozzle is accomplished by pressurizing the entire vessel. Such testing is time consuming, expensive, and can create potential hazards. In addition, welding operations utilized to join nozzles or branch connections to existing vessels may be performed in the presence of combustible or otherwise harmful materials or vapors which are present within the vessel.

These problems are well known, and tools for solving these problems exist in the prior art. For example, U.S. Pat. No. 6,675,634 to Berneski et al. discloses a tool and method for isolating and testing a connection, such as a welded connection, which interconnects the wall of a tank, vessel, or pipe to a branch pipe or nozzle. This tool uses an inner subassembly and an outer assembly to form a fluid-tight chamber around a nozzle connection to a vessel. The inner subassembly extends around the internal end of the nozzle connection and forms a fluid-tight seal with the inner surface of the vessel. The outer subassembly forms a fluid-tight seal with an external flange of the nozzle. When the tool is installed and tightened, a resilient face seal of the inner subassembly is compressed into engagement with the inner surface of the vessel. The nozzle connection is completely enclosed within the subassembly and is thus isolated from the remainder of the vessel.

The problem with the tool of the '634 patent to Berneski is that the resilient seal does not easily conform to surface irregularities on the inner surface of the vessel. Further, elastic stretching of the tool during pressure testing may move the inner subassembly slightly away from the vessel wall, breaking the seal and defeating the test. These deficiencies may be offset by using "torquing" methods to set the seal in place. However, this results in the introduction of concentrated stresses in the vessel wall in contact with the narrow seal. This may create a future weak spot.

Besides sealing deficiencies, the '634 patent to Berneski also fails to teach a tool that can adapt to variations in nozzle configuration. For example, the tool cannot adapt to angular variations between the external flange of the nozzle and the inner surface of the vessel. This lack of adaptability means that other tools must be used, increasing the costs of maintaining and testing nozzles.

SUMMARY

The present invention is a novel tool and method for the isolation and pressure-testing of connections, such as welds, between a vessel and a nozzle or branch pipe. The present invention overcomes the deficiencies of the prior art by providing a nozzle testing tool with an improved seal that expands as testing pressure is increased. It further provides a tool whose configuration can easily be adjusted in order to accommodate variations in nozzle configuration.

The sealing method of the present invention expands a seal into sealing contact with the inner surface of a vessel, preventing the seal problems associated with prior art tools. Since the seal expands as testing pressure is increased, the sealing contact is not adversely affected by elastic stretching of the tool. Thus, torquing of the tool and the associated stresses can be avoided. The seal also includes a number of ridges along its vessel wall-contacting surface, allowing the seal to accommodate imperfections on the inner surface of the vessel, such as pits or scratches, or to cut through any films or wax buildup on the inner surface. The above improvements create a better seal. Furthermore, torquing stress to the vessel is avoided. In this regard, the contact pressure of the seal of the present invention will be about the same as the test fluid pressure.

The tool of the present invention can also be adjusted in a number of ways, making the tool versatile. The tool can be fitted with a ball and socket joint that allows the tool to readily adapt to various angular variations between the external flange of a nozzle and the inner surface of the nozzle's vessel. The tool can also be adjusted for various nozzle lengths. The adjustability of the tool presents an economical advantage since a new tool does not need to be used for each differently configured nozzle.

The unique seal and the adjustability of the present invention result in a significant improvement over the prior art.

According to the present invention then, there is provided apparatus for testing or isolating a nozzle having an inner end extending within a vessel and an outer end extending externally from said vessel, said apparatus comprising: a cylindrical rod for insertion into said nozzle; a cap for enclosing a space surrounding the inner end of said nozzle, said cap comprising a cap upper portion having a top and a bottom, a cap skirt having an inner surface and extending downwards from the bottom of said upper portion of said cap, a cap seal disposed concentrically around the inner surface of said cap skirt, a bottom surface of said cap seal adapted to engage an inner surface of a wall of the vessel, said cap seal actuatable in response to applied fluid pressure to expand into sealing contact with said inner surface of a wall of the vessel; and a flange assembly for forming a fluid-tight seal with the outer end of said nozzle; wherein said cap, said rod and said flange assembly are adapted to interconnect to form a fluid-tight chamber that isolates said nozzle from the interior of said vessel.

According to another aspect of the present invention, there is also provided a method of hydro-testing a nozzle having an inner end extending within a vessel and an outer end extending externally from said vessel, said method comprising the steps of forming a fluid tight chamber that isolates said nozzle from the interior of said vessel; providing a seal between said chamber and the interior of said vessel that expands into sealing contact with an inner surface of a wall of the vessel in response to applied fluid pressure; periodically increasing the pressure in said chamber by increments representing a fraction of a predetermined total test pressure, the incremental increase in pressure allowing said seal to gradually conform to said inner surface of a wall of the vessel; and monitoring the integrity of said nozzle during the increase of pressure in said chamber.

BRIEF DESCRIPTION OF THE DRAWINGS

Preferred embodiments of the present invention will now be described by way of example and with reference to the accompanying drawings in which.

DETAILED DESCRIPTION

Figure 1:
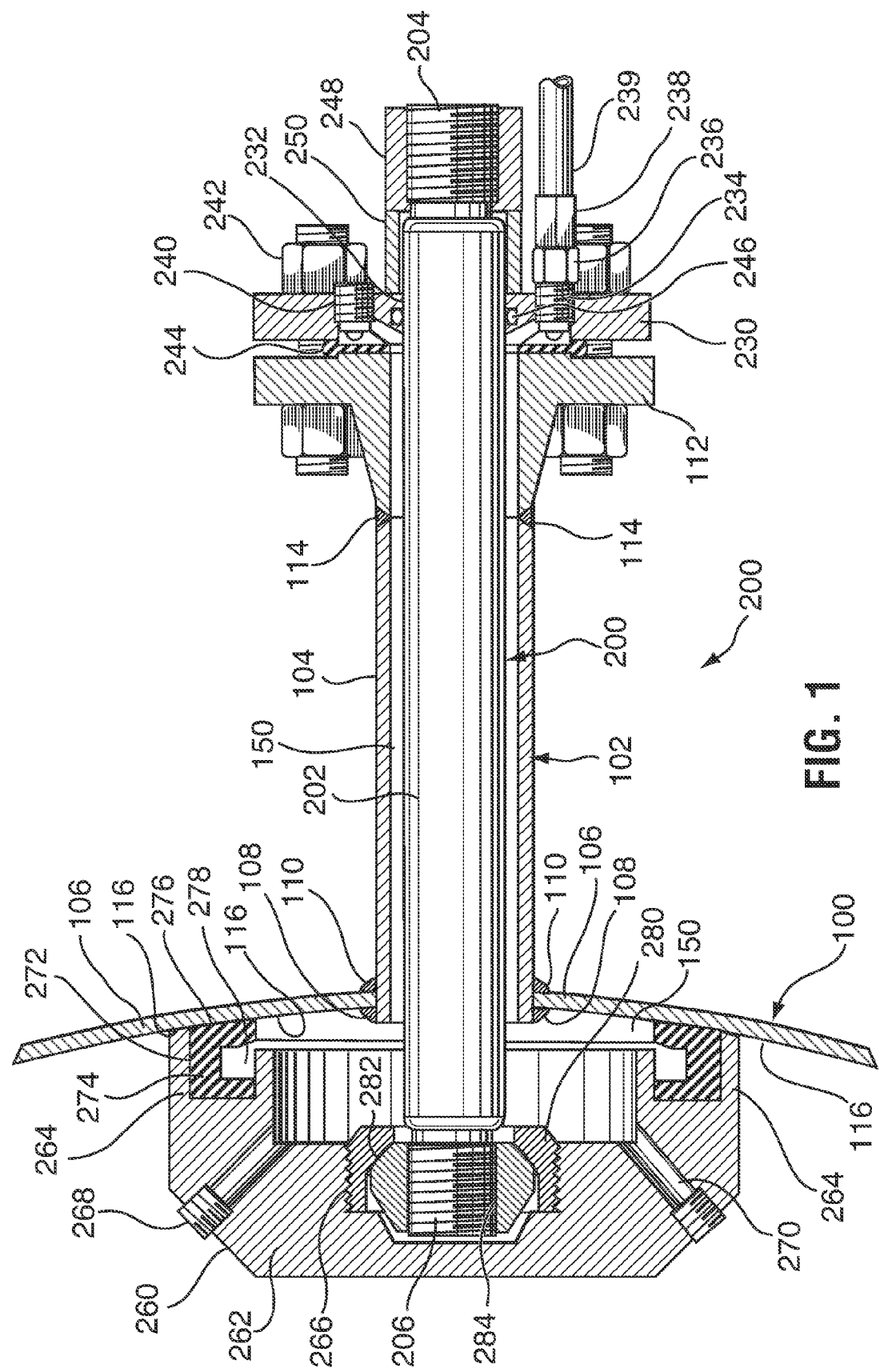
FIG. 1 is a cross sectional view of the tool for hydro-testing a nozzle in the present invention in an engaged position.

FIG. 1 shows the tool 200 of the present invention configured to hydro-test a nozzle 102 having an inner end opening into the interior of a vessel 100 and an outer end extending externally from the vessel. The nozzle comprises a cylindrical pipe segment 104 attached at one end to a wall 106 of the vessel by welds, 108, 110. A nozzle flange 112 is attached to the outer end of pipe segment 104 by weld 114. The interior of pipe segment 104 is in fluid communication with the interior of vessel 100.

Generally, tool 200 creates a fluid-tight chamber 150 under welds 108, 110, 114. The integrity of the welds is tested by pumping a pressurized fluid, usually water, into the fluid-tight chamber. The pressure in the chamber is increased to a predetermined test pressure, usually about 1.5 times the weld operating pressure. The high pressure of the water tests the integrity of welds. The pressure in the chamber and the integrity of the welds and seal surfaces are monitored for the duration of a test.

Tool 200 generally comprises a rod 202, a flange assembly 230 at the rod's end outside the vessel and a cap 260 at the opposite end inside the vessel. A detailed description of these components follows. Rod 202 is a cylindrical shaft having outwardly disposed threads at upstream end 204 and downstream end 206. The rod can be fabricated advantageously from aluminum or stainless steel.

Flange assembly 230 comprises a centrally bored cylinder 232 whose inner diameter is adapted to fit closely over the outer diameter of cylindrical rod 202. The flange assembly supports on its exterior surface the various spacers, seals and attachment means that will be described below and which are used to form a fluid tight seal between the rod and nozzle flange 112.

A conduit 234 is formed through the flange assembly for the passage of pressurized fluid. The flange assembly is fitted with an adapter 236 which receives standard couplings 238 to connect conduit 234 to a hydraulic supply line 239 that delivers pressurized fluid from an external pump. Another conduit 240 is formed through the flange assembly and can be selectively sealed or unsealed to allow the passage of air.

Cap 260 comprises an upper portion 262 with a top and a bottom and a skirt 264. In the center of the bottom of the upper portion of cap 260, there is a cylindrical aperture 266 with inwardly disposed threads adapted to receive the downstream end 206 of the rod in a manner to be described below. Conduits 268 and 270 are formed through the upper portion of cap and can be selectively sealed or unsealed to allow the passage of air.

Cap skirt 264 comprises an inner surface 272 that extends downwardly from the bottom of upper portion 262 of the cap towards inner surface 116 of vessel wall 106. An annular resiliently deformable cap seal 274 is disposed concentrically inside the cap skirt. The bottom surface 276 of cap seal 274 is adapted to engage inner surface 116 of wall 106 of the vessel. The bottom surfaces of cap skirt 264 and cap seal 274 are provided with a non-planar contour which is similar in contour to inner surface 116 of the vessel wall.

Bottom surface 276 of the cap seal is advantageously ribbed or serrated. This profile conforms to any small blemishes in the inner surface of the vessel wall, such as pits, seams or scratches, and the ribs will also penetrate any dirt, wax or other loose material coating the inner surface. It will be additionally appreciated that the cap seal design presents a large surface area in contact with the inner surface for increased seal integrity. Moreover, the cap seal is of relatively soft material that will not itself damage coatings applied to some vessel interiors.

An annular channel or recess 278 formed in the interior circumference of cap seal 274 allows fluid pressure to energize and expand the cap seal. Thus, sealing is self-actualizing and increases with increasing test pressures. Other means of allowing the cap seal to expand are also contemplated.

Cap seal 274 is fabricated from any suitable elastomer, such as rubber, neoprene, fluorocarbon, polyurethane and so forth. The materials used must be adequate to meet operational pressures including an adequate safety factor, and in specific applications, must also be heat and chemical resistant.

As shown in FIG. 1, cylindrical aperture 266 in cap 260 can be fitted with a correspondingly threaded socket 280 adapted to allow a mated ball end 282 to swivel. In this embodiment, the ball end has an aperture 284 with inwardly disposed threads adapted to receive the outwardly disposed threads on the downstream end of rod 202. When the cap is attached to the rod, the cap can swivel vertically and horizontally relative to the rod.

A description of the assembly and operation of tool 200 follows. First, nozzle flange 112 and flange assembly 230 are connected using stud and nut combination 242. Alternatively, the nozzle flange and flange assembly can be connected using a fast-bolt or by a cam lock system. A gasket 244 is disposed between the nozzle flange and the flange assembly to provide a seal between these two elements.

Cap 260 is threaded onto downstream end 206 of rod 202 as described above. From inside vessel 100, the rod, with cap 260 attached is inserted into pipe segment 104 of the nozzle and through centrally bored cylinder 232 of flange assembly 230 until the upstream end 204 of the rod extends a distance beyond flange assembly 230. After insertion, the rod straddles the length of the nozzle and the welds therein. Fluid-tight sealing between the flange assembly and the rod is provided by one or more o-rings 246. Sealing between the cap and the inner vessel wall is provided by cap seal 274.

The cap is held against the inner surface 116 of vessel wall while nut 248 is threaded onto the upstream end of the rod that extends beyond the flange assembly. When nut 248 is tight against the flange assembly, there is no need for additional tightening of the nut. The nut secures cap 260 against the inner surface of the vessel wall and prevents axial separation between the cap and the vessel wall.

If necessary, an appropriately sized spacer 250 can be disposed about upstream end 204 of the rod between nut 248 and flange assembly 230. Generally, the spacer should extend from the flange assembly to the threading on the upstream end of the rod. The spacer can be lengthened or shortened to accommodate nozzles of varying length.

Following assembly of tool 200, the annular space enclosed by rod 202, pipe segment 104, cap 260, flange assembly 230 and inner surface 116 of the vessel wall forms fluid-tight chamber 150.

A hydro-test of nozzle 102 can then be conducted as follows.

Pressurized fluid is pumped into fluid-tight chamber 150 via hydraulic supply line 239 which is connected through adaptor 236 to conduit 234 formed through the flange assembly. The highest of conduits 240, 268 and 270 is unsealed to allow air from fluid-tight chamber 150 to vent as the chamber fills with fluid. When the air is displaced, the conduit is resealed.

The pressure of the fluid in the fluid-tight chamber is then increased to a predetermined test pressure, usually about 1.5 times the weld operating pressure, in increments of 25% every 5 minutes. For example, when the predetermined test pressure is 200 psi, 50 psi is applied at the start of the test, 100 psi is applied after 5 minutes, 150 psi is applied after 10 minutes and 200 psi is applied after 15 minutes.

The staggered application of pressure allows cap seal 274 to gradually conform to the surfaces that it contacts. Initially, the interference fit between the cap seal and the inner surface of the vessel wall prevents fluid blowby. As the pressure within fluid-tight chamber 150 builds, the cap seal expands and the bottom surface 276 of the cap seal flattens against the inner surface of the vessel wall, completing the seal between these two elements. The expansion of cap seal 274 under pressure ensures that the seal continues to function even as the cap moves slightly away from the vessel wall due to elastic stretching of rod 202. This eliminates the need to pretension the rod or tighten the nut following pressurization. The expansion of the cap seal also allows the seal to tolerate variations in the vessel wall profile. The shape of cap skirt 264 around seal 274 prevents the seal from being extruded as the test pressure builds. Since the contact pressure of the seal against the vessel's inner wall is substantially the same as the hydraulic test pressure, concentrated stresses in the vessel wall are avoided.

The pressure in fluid-tight chamber 150 and the integrity of the welds and the seal surfaces are monitored for the duration of the test. When the test is complete, the pressure is released and the test fluid is drained from the fluid-tight chamber.

Tool 200 can easily be adjusted to accommodate nozzle configurations different from nozzle 102. The tool, fitted with a ball and socket joint, is readily adaptable to various angular variations between a nozzle flange and a vessel wall. When cap 230 can swivel to conform to the vessel wall, the extrusion gap around the perimeter of cap skirt 264 is held to a minimum. This prevents cap seal 274 from being extruded through any uneven gaps when the fluid-tight chamber is pressurized. Further, by using different sized spacers 250, the tool can also be adjusted for various nozzle lengths. The adjustability of the tool presents an economical advantage since a new tool does not need to be used for each differently configured nozzle.

When the test is complete, the tool is disassembled in reverse order to that described above and removed.

All of the above features provide an illustration of preferred embodiment of the invention, but are not intended to limit the scope of the invention, which is fully described in the claims below.

What is claimed is:

1. Apparatus for testing or isolating a nozzle having an inner end opening into the interior of a vessel and an outer end extending externally from said vessel, said apparatus comprising:

a cylindrical rod for insertion through said nozzle into the interior of the vessel;

a cap for enclosing a space surrounding the inner end of said nozzle, said cap comprising:
  i) a cap upper portion having a top and a bottom,
  ii) a cap skirt having an inner surface and extending downwards from the bottom of said upper portion of said cap,
  iii) a cap seal disposed concentrically around the inner surface of said cap skirt, a bottom surface of said cap seal adapted to engage an inner surface of a wall of the vessel, said cap seal actuatable in response to applied fluid pressure to expand outwardly from the bottom of said cap upper portion along the inner surface of said cap skirt and in the direction of said inner surface of a wall of the vessel to maintain sealing contact with said inner surface of a wall of the vessel when said cap upper portion and said cap skirt are forced away from said inner surface by said applied fluid pressure; and a flange assembly for forming a fluid-tight seal with the outer end of said nozzle;

wherein said cap, said rod and said flange assembly are adapted to interconnect to form a fluid-tight chamber that isolates said nozzle from the interior of said vessel.

2. The apparatus of claim 1 wherein an annular groove in fluid communication with said fluid-tight chamber is formed in the inner surface of said cap seal, said groove allowing said cap seal to expand in response to applied fluid pressure.

3. The apparatus of claim 1 including a fluid passage in said flange assembly for the ingress and egress of fluid from said fluid-tight chamber.

4. The apparatus of claim 1 including nut means threadedly connectable to said rod adjacent said flange assembly for preventing axial separation of said cap from said inner surface of a wall of the vessel.

5. The apparatus of claim 4 including spacer means disposed around said rod between said nut means and said flange assembly, said spacer means for adapting said apparatus to the length of said nozzle.

6. The apparatus of claim 1 wherein said flange assembly includes at least one sealable conduit formed completely therethrough for the flow of air from one side of the flange assembly to the other.

7. The apparatus of claim 1 wherein said cap includes at least one sealable conduit formed completely therethrough for the flow of air from one side of the cap to the other.

8. The apparatus of claim 1 wherein said cap is connected to said rod with a ball and socket joint, said joint allowing the cap to swivel vertically and horizontally relative to said rod.

9. The apparatus of claim 8 wherein said ball and socket joint is disposed at said bottom of said upper cap portion such that said ball and socket joint is wholly located within said fluid-tight chamber.

10. The apparatus of claim 9 wherein said ball and socket joint comprises:
  a ball end defining a threaded aperture therethrough for threadably engaging a downstream end of said rod; and
  a socket for receiving and securely retaining said ball end, said socket defined at least by a threaded socket portion that is threadably engageable with a threaded aperture defined by said bottom of said upper cap portion.

11. The apparatus of claim 1 wherein said cap seal is ribbed on the surface thereof that engages said inner surface of a wall of the vessel.

12. A method of hydro-testing a nozzle having an inner end opening into the interior of a vessel and an outer end extending externally from said vessel using a test tool having a cap for enclosing a space surrounding the inner end of said nozzle, said method comprising the steps of:

forming a fluid-tight chamber with said test tool that isolates said nozzle from the interior of said vessel;

providing a seal between said cap and an inner surface of a wall of the vessel, said seal being actuatable in response to applied fluid pressure to expand outwardly from a bottom of said cap in the direction of said inner surface of a wall of the vessel to maintain sealing contact with said inner surface of a wall of the vessel when said cap is forced away from said inner surface of a wall by said applied fluid pressure;

periodically increasing the pressure in said chamber by increments representing a fraction of a predetermined total test pressure, the incremental increase in pressure allowing said seal to gradually conform to said inner surface of a wall of the vessel; and monitoring the integrity of said nozzle during the increase of pressure in said chamber.

13. The method of claim 12 wherein said seal is ribbed on the surface thereof that engages said inner surface of a wall of the vessel.

14. The method of claim 13 wherein said seal includes a groove in fluid communication with said fluid-tight chamber, said groove allowing said seal to expand in response to applied fluid pressure.

* * * * *